US008921465B2

(12) United States Patent
Hirakawa et al.

(10) Patent No.: US 8,921,465 B2
(45) Date of Patent: Dec. 30, 2014

(54) POLYBUTYLENE TEREPHTHALATE RESIN COMPOSITION

(75) Inventors: Takakazu Hirakawa, Fuji (JP); Nobuyuki Sueyasu, Fuji (JP)

(73) Assignee: Wintech Polymer Ltd., Tokyo (JP)

( * ) Notice: Subject to any disclaimer, the term of this patent is extended or adjusted under 35 U.S.C. 154(b) by 0 days.

(21) Appl. No.: 13/700,434

(22) PCT Filed: May 13, 2011

(86) PCT No.: PCT/JP2011/061058
§ 371 (c)(1),
(2), (4) Date: Apr. 5, 2013

(87) PCT Pub. No.: WO2011/148796
PCT Pub. Date: Dec. 1, 2011

(65) Prior Publication Data
US 2013/0203905 A1     Aug. 8, 2013

(30) Foreign Application Priority Data

May 27, 2010    (JP) ................................. 2010-121430

(51) Int. Cl.
*C08K 5/5313* (2006.01)
*C08L 67/02* (2006.01)
*C08K 5/00* (2006.01)
*C08L 77/02* (2006.01)
*C08K 5/3492* (2006.01)

(52) U.S. Cl.
CPC ............... *C08L 67/02* (2013.01); *C08K 5/0066* (2013.01); *C08K 5/5313* (2013.01); *C08L 77/02* (2013.01); *C08K 5/34928* (2013.01)
USPC ............................ 524/126; 524/101; 524/133

(58) Field of Classification Search
USPC ......................................... 524/101, 126, 133
See application file for complete search history.

(56) References Cited

U.S. PATENT DOCUMENTS

| 4,150,674 A | * | 4/1979 | Yung | 442/361 |
| 5,270,401 A | * | 12/1993 | Sham et al. | 525/420 |
| 2001/0007888 A1 | | 7/2001 | Asano | |
| 2003/0144402 A1 | * | 7/2003 | Schenck | 524/445 |
| 2005/0137300 A1 | * | 6/2005 | Schlosser et al. | 524/115 |

FOREIGN PATENT DOCUMENTS

| JP | 9-59497 A | 3/1997 |
| JP | 2001-247751 A | 9/2001 |
| JP | 2002-161199 A | 6/2002 |
| JP | 2007-9230 A | 1/2007 |
| JP | 2009-132935 A | 6/2009 |
| JP | 2010-24324 A | 2/2010 |

OTHER PUBLICATIONS

Office action issued to CN Application No. 201180025722.7, mailed Nov. 4, 2013.
Machine Translation of JP 2002-161199.
International Search Report issued to International Application No. PCT/JP2011/061058, mailed on Jun. 7, 2011.

* cited by examiner

*Primary Examiner* — Peter Szekely
(74) *Attorney, Agent, or Firm* — Hoffmann & Baron, LLP

(57) ABSTRACT

To provide a polybutylene terephthalate resin composition having excellent tracking resistance, mechanical strength, and low-hygroscopicity, and being flame-retarded by a non-halogen-containing flame retardant. A polybutylene terephthalate resin composition is prepared by compounding polyamide resin, an organic phosphorous flame retardant, and a nitrogen-containing flame retardant assistant into polybutylene terephthalate resin, wherein the content of the polyamide resin is not less than 1 part by mass and not more than 15 parts by mass to 100 parts by mass of the polybutylene terephthalate resin.

10 Claims, No Drawings

POLYBUTYLENE TEREPHTHALATE RESIN COMPOSITION

CROSS-REFERENCE TO RELATED APPLICATIONS

This application is the National Stage of International Application No. PCT/JP2011/061058, filed May 13, 2011, which claims the benefit of Japanese Application No. 2010-121430, filed May 27, 2010, the entire contents of all of which are incorporated by reference herein.

FIELD OF THE INVENTION

The present invention relates to a polybutylene terephthalate resin composition having excellent tracking resistance, flame retardancy, and mechanical properties, and low-hygroscopicity.

BACKGROUND OF THE INVENTION

A polybutylene terephthalate resin is used in a wide range of applications as an engineering plastic, such as automobile parts or electric/electronic parts because of having the excellent mechanical properties, electric properties, heat resistance, anti-weatherability, water resistance, chemical resistance, and solvent resistance.

For the use in automobile parts or electric/electronic parts, flame retardancy and tracking resistance are generally required. As such, various studies about improvement of flame retardancy of the polybutylene terephthalate resin composition for satisfying the UL-94 standard of Underwriters Laboratories or tracking resistance such as comparative tracking index (abbreviation: CTI) have been reported.

As specific examples of the polybutylene terephthalate resin composition having improved flame retardancy and tracking resistance, a polybutylene terephthalate resin composition containing about 30 parts by mass or more of a polyamide resin to 100 parts by mass of a polybutylene terephthalate resin, in which an organobromine compound (tetrabromo bisphenol A type epoxy resin) and a flame retardant assistant (antimony trioxide) are further added in combination, is disclosed (Patent Document 1).

Patent Document 1: Japanese Unexamined Patent Application, Publication No. H09-059497

SUMMARY OF THE INVENTION

Problems to be Solved by the Invention

However, the polybutylene terephthalate resin composition disclosed in Patent Document 1 is problematic in that, although it contains a great amount of a polyamide resin to improve tracking resistance of the polybutylene terephthalate resin composition containing a flame retardant, it also contains a great amount of a polyamide resin, and thus the mechanical strength such as tensile strength and flexural strength tends to be lower than the polybutylene terephthalate resin.

Further, the polybutylene terephthalate resin composition disclosed in Patent Document 1 is problematic in that, although it has excellent flame retardancy and tracking resistance, by containing a great amount of easily hygroscopic polyamide resin, the polybutylene terephthalate resin composition is also easily hygroscopic, and as a result, the hydrolysis resistance of the polybutylene terephthalate resin composition is impaired.

It is possible to consider lowering the use amount of the polyamide resin from the viewpoint of poor mechanical strength or hygroscopicity. However, for such case, the effect of improving the tracking resistance is not obtained at sufficient level. As described above, since the improvement of the tracking resistance by addition of a polyamide resin, and lowering of mechanical strength and inhibition of hygroscopicity, are not compatible with each other, it is very difficult to obtain a polybutylene terephthalate resin composition which has excellent tracking resistance and mechanical strength, and low-hygroscopicity.

Further, the polybutylene terephthalate resin composition disclosed in Patent Document 1 uses, as a flame retardant, a tetrabromo bisphenol A type epoxy resin, which is an organobromine compound. However, considering the possibility of having dioxin during combustion as a waste treatment, non-halogenation is required for many resin compositions.

The present invention is devised to solve the problems described above and an object of the invention is to provide a polybutylene terephthalate resin composition having excellent tracking resistance and mechanical strength, and low-hygroscopicity, and being flame-retarded by a non-halogen-containing flame retardant.

Means for Solving the Problems

The inventors of the present invention found that, by compounding a polyamide resin, an organic phosphorous flame retardant, and a nitrogen-containing flame retardant assistant into a polybutylene terephthalate resin, in which the content of the polyamide resin is not less than 1 part by mass and not more than 15 parts by mass to 100 parts by mass of the polybutylene terephthalate resin, a polybutylene terephthalate resin composition having excellent tracking resistance, mechanical strength, and low-hygroscopicity, and being flame-retarded by a non-halogen-containing flame retardant can be obtained, and completed the invention accordingly.

(1) A polybutylene terephthalate resin composition comprising (A) polybutylene terephthalate resin, (B) polyamide resin, (C) an organic phosphorous flame retardant, and (D) a nitrogen-containing flame retardant assistant, in which the content of said (B) polyamide resin is not less than 1 part by mass and not more than 15 parts by mass to 100 parts by mass of said (A) polybutylene terephthalate resin.

(2) The polybutylene terephthalate resin composition according to above (1), in which the content of said (B) polyamide resin is not less than 1 part by mass and less than 10 parts by mass to 100 parts by mass of said (A) polybutylene terephthalate resin.

(3) The polybutylene terephthalate resin composition according to above (1) or (2), in which said (B) polyamide resin is one or more selected from the group consisting of Nylon 6, Nylon 11, and Nylon 12.

(4) The polybutylene terephthalate resin composition according to any one of above (1) to (3), in which said (C) organic phosphorous flame retardant is phosphinic acid salt and/or diphosphinic acid salt.

(5) The polybutylene terephthalate resin composition according to any one of above (1) to (4), in which said (D) nitrogen-containing flame retardant assistant is a salt of a triazine compound and cyanuric acid or isocyanuric acid, and/or a complex salt of an amino group-containing nitrogen compound and polyphosphoric acid.

(6) The polybutylene terephthalate resin composition according to any one of above (1) to (5), further comprising (E) a phosphorous stabilizer.

(7) The polybutylene terephthalate resin composition according to above (6), in which said (E) phosphorous stabilizer is one or more selected from the group consisting of a phosphoric acid ester compound, a phosphorous acid ester compound, a phosphonic acid ester compound, and a metallic phosphate compound.

(8) The polybutylene terephthalate resin composition according to any one of above (1) to (7), further comprising (F) a filler.

(9) The polybutylene terephthalate resin composition according to any one of above (1) to (8), in which, in accordance with the third edition of IEC112, the comparative tracking index (CTI) measured by using 0.1% aqueous ammonium chloride solution and a platinum electrode is 600 V or more.

(10) A molded article for a component of an electric vehicle, molded from the polybutylene terephthalate resin composition according to any one of above (1) to (9).

(11) A case for housing a component of an electric vehicle, molded from the polybutylene terephthalate resin composition according to any one of above (1) to (9).

Effects of the Invention

According to the invention, a polybutylene terephthalate resin composition having excellent tracking resistance, mechanical strength, and low-hygroscopicity, and being flame-retarded by a non-halogen-containing flame retardant is provided.

DETAILED DESCRIPTION OF THE INVENTION

Herein below, embodiments of the invention will be described in detail. However, the invention is not limited at all to the embodiments below, and appropriate modifications can be made within the purpose of the invention. Further, when the same explanation is applied, it may be omitted as appropriate. However, gist of the invention is not limited thereby.

Herein below, (A) polybutylene terephthalate resin, (B) polyamide resin, (C) an organic phosphorous flame retardant, (D) a nitrogen-containing flame retardant assistant, (E) a phosphorous stabilizer, (F) a filler, (G) other components as well as a method of producing the polybutylene terephthalate resin composition will be described in order.

(A) Polybutylene Terephthalate Resin

The (A) polybutylene terephthalate resin which is used for the polybutylene terephthalate resin composition of the invention is a polybutylene terephthalate-based resin which is obtained by polycondensation of a dicarboxylic acid component containing at least terephthalic acid or an ester-forming derivative thereof ($C_{1-6}$ alkyl ester or acid halide or the like) and a glycol component containing at least alkylene glycol with four carbon atoms (1,4-butane diol) or an ester-forming derivative thereof. The polybutylene terephthalate resin is not limited to the homo-polybutylene terephthalate resin, and it may be a copolymer containing 60 mol % or more (specifically not less than 75 mol % and not more than 95 mol %) of butylene terephthalate unit.

The amount of terminal carboxyl groups in the (A) polybutylene terephthalate resin that is used in the invention is not specifically limited as long as the purpose of the invention is not impaired. The amount of terminal carboxyl groups in the polybutylene terephthalate resin that is used in the invention is preferably 30 meq/kg or less, and more preferably 25 meq/kg or less. When the polybutylene terephthalate resin having terminal carboxyl groups in an amount within the above range is used, the polybutylene terephthalate resin composition obtained does not easily have the lowering of the strength by hydrolysis in a moist-heat environment, in particular.

Furthermore, the intrinsic viscosity of the (A) polybutylene terephthalate resin used in the invention is not specifically limited as long as the purpose of the invention is not impaired. The intrinsic viscosity (IV) of the (A) polybutylene terephthalate resin is preferably not less than 0.60 dL/g and not more than 1.2 dL/g. More preferably, it is not less than 0.65 dL/g and not more than 0.9 dL/g. By using the polybutylene terephthalate resin having the intrinsic viscosity within the above range, the polybutylene terephthalate resin composition having particularly excellent moldability can be obtained. The intrinsic viscosity can be also adjusted by blending polybutylene terephthalate resins having different intrinsic viscosities. For example, by blending a polybutylene terephthalate resin having an intrinsic viscosity of 1.0 dL/g with a polybutylene terephthalate resin having an intrinsic viscosity of 0.7 dL/g, a polybutylene terephthalate resin having an intrinsic viscosity of 0.9 dL/g can be produced. The intrinsic viscosity (IV) of the (A) polybutylene terephthalate resin can be determined, for example, in o-chlorophenol at temperature condition of 35° C.

In the (A) polybutylene terephthalate resin that is used in the invention, examples of the dicarboxylic acid component (comonomer component) other than terephthalic acid and an ester-forming derivative thereof include $C_{8-14}$ aromatic dicarboxylic acid including isophthalic acid, phthalic acid, 2,6-naphthalene dicarboxylic acid, and 4,4'-dicarboxy diphenyl ether; $C_{4-16}$ alkyl dicarboxylic acid including succinic acid, adipic acid, azelaic acid, and sebacic acid; $C_{5-10}$ cycloalkyl dicarboxylic acid including cyclohexane dicarboxylic acid; and an ester-forming derivative of these dicarboxylic acid components ($C_{1-6}$ alkyl ester derivatives, acid halides or the like). Those dicarboxylic acid components can be used alone or in combination of two or more thereof.

Among the dicarboxylic acid components described above, preferable dicarboxylic acid component includes $C_{2-12}$ aromatic dicarboxylic acid such as isophthalic acid and $C_{6-12}$ alkyl dicarboxylic acid such as adipic acid, azelaic acid, and sebacic acid.

Examples of glycol component (comonomer component) other than 1,4-butane diol that is included in the polybutylene terephthalate resin used in the invention include $C_{2-10}$ alkylene glycol such as ethylene glycol, propylene glycol, trimethylene glycol, 1,3-butylene glycol, hexamethylene glycol, neopentyl glycol, or 1,3-octane diol; polyoxy alkylene glycol such as diethylene glycol, triethylene glycol, or dipropylene glycol; alicyclic diol such as cyclohexane dimethanol or hydrogenated bisphenol A; aromatic diol such as bisphenol A or 4,4-dihydroxy biphenyl; $C_{2-4}$ alkylene oxide adduct of bisphenol A such as 2-mole adduct of ethylene oxide of bisphenol A or 3-mole adduct of propylene oxide of bisphenol A; and an ester-forming derivative of these glycols (acetylated product or the like). These glycol components can also be used alone or in combination of two or more thereof.

Among the glycol components described above, more preferred glycol component includes $C_{2-6}$ alkylene glycol such as ethylene glycol or trimethylene glycol, polyoxyalkylene glycol such as diethylene glycol, and alicyclic diol such as cyclohexane dimethanol.

Any of the polybutylene terephthalate copolymer obtained by copolymerization of the above comonomer components can be used suitably as the (A) polybutylene terephthalate resin. Further, as the (A) polybutylene terephthalate resin, a homo-polybutylene terephthalate polymer and a polybutylene terephthalate copolymer can be used in combination.

(B) Polyamide Resin

The (B) polyamide resin used in the invention can be produced by polymerization according to a common method, using a monomer such as lactam, aminocarboxylic acid or diamine and a dicarboxylic acid.

Examples of the lactam include ε-caprolactam, ω-undecyl-lactam, and ω-laurolactam. Examples of the aminocarboxylic acid include 6-aminocaproic acid, 11-aminoundecanoic acid, 12-aminododecanoic acid, and p-aminomethylbenzoic acid. Examples of the diamine include tetramethylenediamine, hexamethylenediamine, nonamethylenediamine, undecamethylenediamine, dodecamethylenediamine, metaxylylenediamine, and paraxylylenediamine. Examples of the dicarboxylic acid include adipic acid, suberic acid, azelaic acid, sebacic acid, dodecanedicarboxylic acid, terephthalic acid, isophthalic acid, naphthalene dicarboxylic acid, 2-chloroterephthalic acid, 2-methylterephthalic acid, 5-methylisophthalic acid, hexahydroterephthalic acid, hexahydroisophthalic acid, and diglycolic acid.

Specific examples of the (B) polyamide resin that can be used in the invention include aliphatic polyamide (Nylon 6, Nylon 11, Nylon 12, Nylon 46, Nylon 66, Nylon 610, Nylon 612, or the like), polyamide in which at least the diamine components is an aliphatic compound (Nylon 6T, Nylon 6T copolymer, Nylon 9T, or the like), or semi-aromatic (copolymeric) polyamide (Nylon MXD6, Nylon 6T/6, Nylon 6T/66, Nylon 6I/12, Nylon 6I/6, Nylon 6I/66, Nylon 6I/6I, Nylon 6I/6I/6, Nylon 6I/6I/66, Nylon 6T/MST, or the like), or the like. The (B) polyamide resin may be used as a combination of two or more types.

Among the (B) polyamide resins, one or more selected from the group consisting of Nylon 6, Nylon 11, Nylon 12, Nylon 66, Nylon 610, and Nylon 612 is preferably used. It is more preferable to use one or more selected from the group consisting of Nylon 6, Nylon 11, and Nylon 12. This is because, when the (B) polyamide resin is subjected to melt kneading with the (A) polybutylene terephthalate resin, each components contained in the polybutylene terephthalate of the invention is homogeneously dispersed so that the polybutylene terephthalate resin composition with good properties can be easily obtained. Among the (B) polyamide resins described above, from the viewpoint of having close melting point to the (A) polybutylene terephthalate resin and being inexpensive and easily obtainable, Nylon 6 is particularly preferably used.

Shape of the (B) polyamide resin used in the invention is not specifically limited. Various shapes such as pellet shape, flake shape, and powder shape can be used. From the viewpoint of having excellent workability for blending the (B) polyamide resin, (C) an organic phosphorous flame retardant and (D) to the (A) polybutylene terephthalate resin, it is preferable to use polyamide having pellet shape.

The use amount of the (B) polyamide resin in the polybutylene terephthalate resin composition of the invention is preferably not less than 1 part by mass and not more than 15 parts by mass, and more preferably not less than 1 part by mass and not more than 10 parts by mass to 100 parts by mass of the polybutylene terephthalate resin. When the use amount of the (B) polyamide resin is excessively large, the polybutylene terephthalate resin composition becomes easily hygroscopic, so that the mechanical properties tend to deteriorate. On the other hand, when the use amount is excessively small, the effect of improving tracking resistance cannot be obtained at sufficient level.

(C) Organic Phosphorous Flame Retardant

As (C) an organic phosphorous flame retardant used in the invention, various known organic phosphorous flame retardants can be used within the range that good flame retardant effect is obtained and the purpose of the invention is not inhibited. Examples of (C) an organic phosphorous flame retardant that is preferably used in the invention include phosphinic acid salt, diphosphinic acid salt, a phosphoric acid ester compound, and a phosphagen compound (phosphonitrile compound). The (C) organic phosphorous flame retardant may be used as a combination of two or more types. Among the (C) organic phosphorous flame retardants described above, phosphinic acid salt and/or diphosphinic acid salt is preferably used from the viewpoint that the lowering of tracking resistance caused by addition of a flame retardant can be prevented by addition of a small amount of a polyamide resin.

As a phosphinic acid salt which is used in the invention as (C) an organic phosphorous flame retardant, the compound represented by the following formula (1) is preferable, and the compound represented by the following formula (2) is preferable as a diphosphinic acid salt.

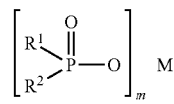

(1)

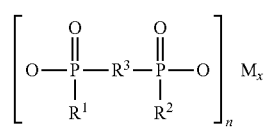

(2)

In the formulae (1) and (2), $R^1$ and $R^2$ represent a phenyl group, a hydrogen, a linear or branched $C_{1-6}$-alkyl group which may contain one hydroxyl group. $R^1$ and $R^2$ both are preferably an ethyl group.

Further, $R^3$ is a linear or branched $C_{1-10}$-alkylene group, an arylene group, an alkylarylene group, or an arylalkylene group.

Further, M represents an alkali earth metal, an alkali metal, Zn, Al, Fe, or boron. Of these, Al is preferable.

m is an integer of from 1 to 3, n is an integer of 1 or 3, and x is 1 or 2.

Specific examples of the phosphinic acid salt that may be preferably used in the invention include dimethylphosphinic acid calcium, dimethylphosphinic acid magnesium, dimethylphosphinic acid aluminum, dimethylphosphinic acid zinc, ethylmethylphosphinic acid calcium, ethylmethylphosphinic acid magnesium, ethylmethylphosphinic acid aluminum, ethylmethylphosphinic acid zinc, diethylphosphinic acid calcium, diethylphosphinic acid magnesium, diethylphosphinic acid aluminum, diethylphosphinic acid zinc, methyl-n-propylphosphinic acid calcium, methyl-n-propylphosphinic acid magnesium, methyl-n-propylphosphinic acid aluminum, and methyl-n-propylphosphinic acid zinc.

Specific examples of the diphosphinic acid salt that may be preferably used in the invention include methane di(methylphosphinic acid) calcium, methane di(methylphosphinic acid) magnesium, methane di(methylphosphinic acid) aluminum, methane di(methylphosphinic acid) zinc, benzene-1,4-(dimethylphosphinic acid) calcium, and benzene-1,4-(dimethylphosphinic acid) magnesium.

Among the phosphinic acid salt and/or diphosphinic acid salt described above, use of diethylphosphinic acid aluminum is particularly preferable.

Specific examples of the phosphoric acid ester compound that may be preferably used in the invention include aliphatic phosphoric acid ester [phosphoric acid tri-$C_{1-10}$ alkyl ester such as trimethyl phosphoric acid, triethyl phosphoric acid, tripropyl phosphoric acid, triisopropyl phosphoric acid, tributyl phosphoric acid, triisobutyl phosphoric acid, pentaerythritol phosphoric acid (for example, NH-1197 manufactured by Great Lakes Chemical, bicyclophosphoric acid ester disclosed in JP 2001-106889 A, or the like); phosphoric acid di-$C_{1-10}$ alkyl ester corresponding to the aforementioned phosphoric acid tri ester, and phosphoric acid mono-$C_{1-10}$ alkyl ester or the like], aromatic phosphoric acid ester [phosphoric acid tri-$C_{6-20}$ aryl ester such as triphenyl phosphoric acid, tricresyl phosphoric acid, trixylyl phosphoric acid, diphenylcresyl phosphoric acid, and tri(isopropylphenyl) phosphoric acid], aliphatic-aromatic phosphoric acid ester [methyl diphenyl phosphoric acid, phenyl diethyl phosphoric acid, spiro-ring type aromatic phosphoric acid ester (diphenylpentaerythritol diphosphate, dicresylpentaerythritol diphosphate, dixylylpentaerythritol diphosphate, and the like that are disclosed in U.S. Pat. No. 3,090,799 B and JP 5-92986 A)].

Specific examples of the phosphagen compound (phosphonitrile compound) that may be preferably used in the present invention include a cyclic and/or chain type phosphagen compound such as phenoxyphosphagen, tolyloxyphosphagen, xylyloxyphosphagen, phenoxytolyloxyphosphagen, and phenoxyxylylphosphagen, a cross-linked phosphagen compound thereof (for example, phenoxyphosphagen cross-linked with a bisphenol residue), and a phosphagen compound disclosed in WO 99/19383 A, WO 00/9518 A, WO 02/98886 A, and WO 04/24844 A.

Use amount of (C) an organic phosphorous flame retardant in the polybutylene terephthalate resin composition of the invention is preferably not less than 5 parts by mass and not more than 100 parts by mass, more preferably not less than 10 parts by mass and not more than 80 parts by mass, and particularly preferably not less than 15 parts by mass and not more than 60 parts by mass to 100 parts by mass of the polybutylene terephthalate resin. When the use amount of the flame retardant is excessively large, the mechanical properties may be deteriorated. On the other hand, when the use amount is excessively small, there may be a case in which good flame retardancy is not obtained.

(D) Nitrogen-Containing Flame Retardant Assistant

The polybutylene terephthalate resin composition of the invention contains (D) a nitrogen-containing flame retardant assistant together with (C) an organic phosphorous flame retardant. As for the nitrogen-containing flame retardant assistant which is used in the invention, it is not specifically limited within the range that good flame retardant effect is obtained and the purpose of the invention is inhibited, and various known nitrogen-containing compounds that are used as a flame retardant assistant can be used. Examples of (D) a nitrogen-containing flame retardant assistant that is preferably used in the invention include a salt of triazine compound with cyanuric acid or isocyanuric acid, a complex salt of a nitrogen compound having an amino group and polyphosphoric acid, and a complex salt of a triazine compound and sulfuric acid. The (D) nitrogen-containing flame retardant may be used as a combination of two or more types.

As for the (D) nitrogen-containing flame retardant assistant used in the invention, a salt of triazine compound with cyanuric acid or isocyanuric acid and/or a complex salt of a nitrogen compound having an amino group and polyphosphoric acid are more preferable, from the viewpoint of having excellent flame retardant effect when combined with (C) an organic phosphorous flame retardant.

Preferred examples of the salt of triazine compound with cyanuric acid or isocyanuric acid include a salt of triazine compound represented by the following formula (3) with cyanuric acid or isocyanuric acid.

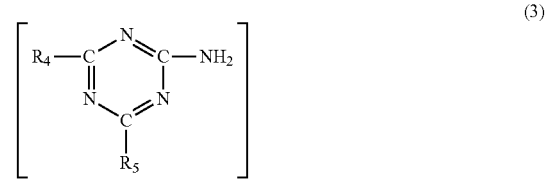

In the formula, $R_4$ and $R_5$ represent a hydrogen atom, an amino group, an aryl group, or an oxyalkyl group having 1 to 3 carbon atoms, and $R_4$ and $R_5$ may be the same or different from each other.

As for the (D) nitrogen-containing flame retardant assistant used in the invention, use of melamine cyanurate is particularly preferable among the salt of triazine compounds represented by the formula (3) with cyanuric acid or isocyanuric acid.

Further, the nitrogen compound having an amino group which is contained in the complex salt of a nitrogen compound having an amino group and polyphosphoric acid includes a heterocyclic compound which has at least one amino group and at least one nitrogen atom as a heteroatom of the cycle, and the heterocycle may contain other heteroatoms such as sulfur and oxygen in addition to nitrogen. Examples of the nitrogen-containing heterocycle include a 5- or 6-membered unsaturated nitrogen-containing heterocycle having plural nitrogen atoms as a ring-constituting atom, such as imidazole, thiadiazole, thiadiazoline, furazane, triazole, thiadiazine, pyrazine, pyrimidine, pyridazine, triazine, and purine. Among the nitrogen-containing cycles, a 5- or 6-membered unsaturated nitrogen-containing cycle having plural nitrogen atoms as a ring-constituting atom is preferable. Triazole and triazine are particularly preferable. Further, among the complex salts of a nitrogen compound having an amino group and polyphosphoric acid, polyphosphoric acid melam, melem, and melamine are preferable.

Use amount of (D) a nitrogen-containing flame retardant assistant in the polybutylene terephthalate resin composition of the invention is preferably not less than 1 parts by mass and not more than 50 parts by mass, more preferably not less than 1 parts by mass and not more than 30 parts by mass, and particularly preferably not less than 1 parts by mass and not more than 20 parts by mass to 100 parts by mass of the polybutylene terephthalate resin. When (D) a nitrogen-containing flame retardant assistant is used in an amount described above with (C) an organic phosphorous flame retardant, excellent flame retardancy of the polybutylene terephthalate resin composition of the invention can be obtained.

(E) Phosphorous Stabilizer

In the present invention, for the purpose of improving heat stability of the polybutylene terephthalate resin composition and inhibiting ester exchange between the polybutylene terephthalate resin and polyamide resin, it is preferable that (E) a phosphorous stabilizer is further added to the polybutylene terephthalate resin.

As for (E) a phosphorous stabilizer used in the invention, various known phosphorous-containing compounds that are used as a stabilizer for polymer materials can be used without being specifically limited, if it is within the range in which the purpose of the invention is not inhibited. Examples of (E) a phosphorous stabilizer that is preferably used in the invention include a phosphoric acid ester compound, a phosphorous acid ester compound, a phosphonic acid ester compound, and a metallic phosphate compound. The (E) phosphorous stabilizer may be used as a combination of two or more types.

Specific examples of the phosphoric acid ester include tributyl phosphate, triethyl phosphate, trimethyl phosphate, triphenyl phosphate, diphenylmonoooxenyl phosphate, dibutyl phosphate, dioctyl phosphate and diisopropyl phosphate.

Specific examples of the phosphorous acid ester include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyl diphenyl phosphite, monodecyl diphenyl phosphite, monoctyl diphenyl phosphite, tris(2,4-di-tert-butylphenyl)phosphite, bis(2,6-di-tert-butyl-4-methylphenyl)pentaerythritol diphosphite, 2,2-methylene bis(4,6-di-tert-butylphenyl)octyl phosphite, bis(nonylphenyl)pentaerythritol diphosphite, bis(2,4-di-tert-butylphenyl)pentaerythritol diphosphate, and distearyl pentaerythritol diphosphite.

Specific examples of the phosphonic acid ester include tetrakis(2,4-di-iso-propylphenyl)-4,4'-biphenylene diphosphponite, tetrakis(2,4-di-n-butylphenyl)-4,4'-biphenylene diphosphponite, tetrakis(2,4-di-tert-butylphenyl)-4,4'-biphenylene diphosphponite, tetrakis(2,4-di-tert-butylphenyl)-4,3'-biphenylene diphosphponite, tetrakis(2,4-di-tert-butylphenyl)-3,3'-biphenylene diphosphponite, tetrakis(2,6-di-iso-propylphenyl)-4,4'-biphenylene diphosphponite, tetrakis(2,6-di-n-butylphenyl)-4,4'-biphenylene diphosphponite, tetrakis(2,6-di-tert-butylphenyl)-4,4'-biphenylene diphosphponite, tetrakis(2,6-di-tert-butylphenyl)-4,3'-biphenylene diphosphponite, tetrakis(2,6-di-tert-butylphenyl)-3,3'-biphenylene diphosphponite, bis(2,4-di-tert-butylphenyl)-biphenyl phosphonite, dimethyl benzene phosphonic acid, diethyl benzene phosphonic acid, and dipropyl benzene phosphonic acid.

As for the metallic phosphate compound, a salt of phosphoric acid with alkali metal or alkali earth metal, specifically, calcium phosphate monobasic, sodium phosphate monobasic, and a hydrate thereof may be used.

Use amount of (E) a phosphorous stabilizer in the polybutylene terephthalate resin composition of the invention is preferably not less than 0.1 parts by mass and not more than 5 parts by mass, more preferably not less than 0.1 parts by mass and not more than 3 parts by mass, and particularly preferably not less than 0.1 parts by mass and not more than 2 parts by mass to 100 parts by mass of the polybutylene terephthalate resin. When (E) a phosphorous stabilizer is added with an amount described above to the polybutylene terephthalate resin composition, the polybutylene terephthalate resin composition of the invention can have excellent heat stability and inhibited ester exchange.

(F) Filler

For the purpose of improving mechanical properties or the like, the polybutylene terephthalate resin composition of the invention preferably further contains (F) a filler. Type of (F) a filler that is used in the invention is not specifically limited if it is within the range in which the purpose of the invention is not inhibited. Various fillers conventionally used as a filer for polymer materials can be used, and any one of an inorganic filler or an organic filler may be used. As for the (F) filler used in the invention, its shape is not limited within the range in which the purpose of the invention is not inhibited, and any of a fibrous filler, a powder or granule-like filler, and a plate-like filler may be used.

Examples of the fibrous filler include inorganic fibrous fiber such as glass fiber, asbestos fiber, silica fiber, silica-alumina fiber, alumina fiber, zirconia fiber, boron nitride fiber, silicon nitride fiber, boron fiber, potassium titanate fiber, and also a fibrous metal such as stainless, aluminum, titan, copper, and brass.

Examples of the powder or granule-like filler include carbon black, graphite, silicate such as silica, quartz powder, glass bead, milled glass fiber, glass balloon, glass powder, calcium silicate, aluminum silicate, kaolin, talc, clay, diatomaceous earth, and wollastonite, metal oxide such as iron oxide, titanium oxide, zinc oxide, antimony trioxide, and alumina, metal carbonate such as calcium carbonate and magnesium carbonate, metal sulfate such as calcium sulfate and barium sulfate, ferrite, silicon carbide, silicon nitride, boron nitride, and various metal powder.

Further, examples of the plate-like filler include mica, glass flake, and various metal foils. As (F) a filler which is contained in the polybutylene terephthalate resin composition of the invention, among the various known fillers, glass fiber is particularly preferable.

Among (F) the fillers, from the viewpoint of a balance between obtaining physical properties of the polybutylene terephthalate resin composition and cost, glass fiber is particularly preferably used.

For the glass fiber, any of known glass fibers is preferably used irrespective of the diameter and the shape such as cylinder, cocoon cross-section, or elliptical cross-section, and it does not depend on length or a method of cutting glass for producing chopped strands, roving, or the like. Although the kind of glass is not specifically limited in the invention, preferred ones are E glass and corrosion-resistant glass containing zirconium element in the composition in view of the quality.

Further, in order to improve the characteristic of interface between (F) a filler and the resin matrix composed of the (A) polybutylene terephthalate resin and (B) polyamide resin, a filler having a surface treated by using an organic treatment agent such as a silane compound or an epoxy compound is preferably used. As for the silane compound or epoxy compound used as the filler above, any known compound can be preferably used, and it does not depend on the type of the silane compound or epoxy compound used for treatment of a surface of (F) a filler.

When (F) a filler is contained in the polybutylene terephthalate resin composition of the invention, content of (F) a filler is preferably 200 parts by mass or less to 100 parts by mass of the total amount of the (A) polybutylene terephthalate resin and (B) polyamide resin. The content of (F) a filler is preferably 200 parts by mass or less in that excellent fluidity is obtained during molding. More preferred content of (F) a filler is 150 parts by mass or less to 100 parts by mass of the total amount of the (A) polybutylene terephthalate resin and (B) polyamide resin.

Other Components

Depending on the application of a molded article, it may be sometimes required to have flammability classification of "V-0" described by UL standard 94. In such case, it is preferable that the polybutylene terephthalate resin composition of the invention is added with an anti-dripping agent such as a fluorine-based resin together with a flame retardant.

Examples of the fluorine-based resin that is suitably used as an anti-dripping agent include a homopolymer or a copolymer of a fluorine-containing monomer such as tetrafluoroethylene, chlorotrifluoroethylene, vinylidene fluoride, hexafluoropropylene, or perfluoroalkyl vinyl ether, and a copolymer of the above-described fluorine-containing monomer with a copolymerizable monomer such as ethylene, propylene, or (meth)acrylate. These fluorine-based resins can be used either singly or in combination of two or more of them.

Examples of the type of fluorine-based resin include a homopolymer such as polytetrafluoroethylene, polychloro trifluoroethylene, or polyvinylidene fluoride, and a copolymer such as a tetrafluoroethylene-hexafluoropropylene copolymer, a tetrafluoroethylene-perfluoroalkyl vinyl ether copolymer, an ethylene-tetrafluoroethylene copolymer, or an ethylene-chlorotrifluoroethylene copolymer.

The addition amount of the fluorine-based resin is preferably 10 parts by mass or less more preferably not less than 0.1 parts by mass and not more than 5 parts by mass, and still more preferably not less than 0.2 parts by mass and not more than 1.5 parts by mass to 100 parts by mass of the (A) polybutylene terephthalate resin.

The polybutylene terephthalate resin composition of the invention may undergo hydrolysis that is caused by hot water or steam, resulting in deteriorated resin. For such reasons, a reactivity stabilizer may be added. With the presence of a reactivity stabilizer, resistance to wet heat and durability and the like are improved, and thus the hydrolytic deterioration of the polybutylene terephthalate resin composition can be inhibited.

Examples of the reactivity stabilizer include a compound having one or more functional group that is selected from a compound having a cyclic ether group, an acid anhydride group, an isocyanate group, an oxazoline group (ring), an oxazine group (ring), an epoxy group, a carbodiimide group, or the like. Among them, from the viewpoint of reactivity with polyester resin, easy handlability, and easy obtainability, a compound having an epoxy group (i.e., an epoxy compound) or a compound having a carbodiimide group (i.e., a carbodiimide compound) is preferably used.

Examples of the epoxy compound include an alicyclic compound such as vinyl cyclohexene dioxide, a glycidyl ester compound such as versatic acid glycidyl ester, a glycidyl ether compound (hydroquinone diglycidyl ether, biphenol diglycidyl ether, bisphenol-A diglycidyl ether, or the like), a glycidylamine compound, a vinyl copolymer having an epoxy group (for example, epoxylated polybutadiene, epoxylated diene-based monomer styrene copolymer or the like), triglycidyl isocyanurate, and epoxy-modified (poly) organosiloxane.

Examples of the carbodiimide compound include polyarylcarbodiimide such as poly(phenylcarbodiimide) and poly(naphthylcarbodiimide), polyalkylarylcarbodiimide such as poly(2-methyl diphenylcarbodiimide), poly(2,6-diethyl diphenylcarbodiimide), poly(2,6-diisopropyl diphenylcarbodiimide), poly(2,4,6-triisopropyl diphenylcarbodiimide), and poly(2,4,6-t-butyl diphenylcarbodiimide), and poly [alkylenebis(alkyl or cycloalkylaryl)carbodiimide such as poly [4,4'-methylenebis(2,6-diethylphenyl)carbodiimide], poly[4,4'-methylenebis(2-ethyl-6-methylphenyl)carbodiimide], poly[4,4'-methylenebis(2,6-diisopropylphenyl)carbodiimide], and poly[4,4'-methylenebis(2-ethyl-6-methylcyclohexylphenyl)carbodiimide].

The epoxy compound or carbodiimide compound may be used either singly or in combination of two or more of them.

Further, the reactivity stabilizer may be added as a master batch having the resin as a matrix. Use of a master batch may be easy in terms of actual handling. A master batch having a polyester resin such as polybutylene terephthalate resin and polyethylene terephthalate resin as a matrix is preferably used. However, a master batch produced by using other resin may be also used. For a master batch having polyester resin, it can be adjusted to be within the pre-determined range of addition amount. The master batch may be added in advance during melt-kneading to be prepared as homogeneous pellets. Further, it is also possible that components other than the reactivity stabilizer are prepared in advance as homogeneous pellets by melt-kneading or the like and the pellet blend product in which master batch pellets of the reactivity stabilizer are dry-blended during molding can be used for molding.

When the reactivity stabilizer is contained in the polybutylene terephthalate resin composition, the content of the reactivity stabilizer is preferably 0.1 to 10 parts by mass to 100 parts by mass of the (A) polybutylene terephthalate resin. The content of the reactivity stabilizer is 0.1 parts by mass or more is preferable in that excellent hydrolysis resistance and stable electrical properties are obtained. The content of 10 parts by mass or less is preferable in that excellent fluidity during molding is obtained. More preferable content of the reactivity stabilizer is 0.5 to 8 parts by mass to 100 parts by mass of the (A) polybutylene terephthalate resin.

Furthermore, to the polybutylene terephthalate resin composition according to the invention, there may be added, if required depending on the purpose, various additives such as an antioxidant, a heat stabilizer, a UV absorber, an anti-static agent, a dye, a pigment, a lubricating agent, a plasticizer, a mold-releasing agent, a crystallization promoting agent, or a crystal nucleating agent.

Method of Producing Polybutylene Terephthalate Resin Composition

The polybutylene terephthalate resin composition of the invention can be produced by various methods that are conventionally known as a method for producing a thermoplastic resin composition. Examples of a suitable method for producing the polybutylene terephthalate resin composition of the invention include a method including melt-kneading and extruding each components by using a melt-kneading device such as a single screw extruder or a twin screw extruder to give pellets.

The polybutylene terephthalate resin composition of the invention is molded with a conventionally known method. Examples of the conventionally known molding method include extrusion molding, extrusion compression molding, gas assisted-extrusion molding, compression molding, multilayer compression molding, rotary molding, heat press molding, blow molding, and foam molding.

The aforementioned polybutylene terephthalate resin composition of the invention prepared by combining (A) polybutylene terephthalate resin, (B) polyamide resin, (C) an organic phosphorous flame retardant, and (D) a nitrogen-containing flame retardant assistant, and if necessary, with (E) a phosphorous stabilizer, (F) a filler, or other components has excellent tracking resistance, mechanical strength, and low-hygroscopicity, and being flame-retarded by a non-halogen-containing flame retardant.

The polybutylene terephthalate resin composition of the invention has excellent flame retardancy as described above, and according to the flame retardancy test that is measured by UL-94 standard vertical combustion test of Underwriters Laboratories using a test piece with a thickness of 0.75 mm, it exhibits V-0.

Further, the polybutylene terephthalate resin composition of the invention has comparative tracking index (CTI) of 600 V or more, in which the comparative tracking index is measured by using 0.1% aqueous solution of ammonium chloride and platinum electrode with reference to the third edition of IEC 112.

For such reasons, the polybutylene terephthalate resin composition of the invention is preferably used for an application which requires flame retardancy and tracking resistance, and it can be preferably applied to various applications, for example, an electric or electronic device part (coil bobbin, connector, relay, disk drive sash, transformer, electronic switch, switch part, outlet part, socket, plug, condenser, various casings, resistor, metallic terminal, or a part used at a wired position), a home appliance part [for example, a housing for an electronic appliance for general household use, a part relating to a computer or peripheral devices, a lighting part, a part relating to phone or facsimile devices, a part relating to an air conditioner, a part relating to video and audio for household use (television, versatile digital disc player, video deck, or the like)], an office automation (OA) device part (a computer related part, a part for sound system, a lighting part, a part relating to telefax or phone, a part relating to facsimile, a part for copying machine, a HVAC part, and a part for optical instruments), a part for mechanical instruments (various gears, various bearings, motor parts, or the like), and automobile part (for example, an automobile ignition device part, an automobile connector and various electric and electronic parts for an automobile).

Further, as having excellent flame retardancy and excellent tracking resistance, the polybutylene terephthalate resin composition of the invention is particularly preferably used as a material for the parts of an electric vehicle, which recently receives a lot of attention.

Further, the polybutylene terephthalate resin composition of the invention can be preferably used as casing for housing a part for an electric vehicle. In the invention, examples of the part for an electric vehicle that is housed in a casing include, although not specifically limited, a power module, a step-up type DC/DC converter, a step-down type DC/DC converter, a condenser, an insulator, a terminal base of a motor, a battery, an electric compressor, a sensor for battery electricity, a junction block, or the like. The polybutylene terephthalate resin composition of the invention is preferably used as a casing material for housing the parts for an electric vehicle.

EXAMPLES

Herein below, the invention is explained in greater detail in view of the Examples. However, it is evident that the invention is not limited to the Examples.

Examples 1 to 6 and Comparative Examples 1 to 4

In Examples 1 to 6 and Comparative Examples 1 to 4, the following materials were used as a component of the polybutylene terephthalate resin composition.
(A) Polybutylene Terephthalate Resin
A1: polybutylene terephthalate resin having intrinsic viscosity of 0.69 (manufactured by WinTech Polymer Ltd.)
A2: polybutylene terephthalate resin having intrinsic viscosity of 0.875 (manufactured by WinTech Polymer Ltd.)
(B) Polyamide Resin
B1: Nylon 6 (manufactured by Ube Industries, Ltd., UBE Nylon (registered trademark) 1015B)
B2: Nylon 12 (manufactured by Daicel-Evonik. Ltd., DIAMIDE (registered trademark) X4442)
B3: Nylon 11 (manufactured by Arkema, Rilsan (registered trademark) BMNO)
(C) Organic Phosphorous Flame Retardant
C1: Aluminum tridiethylphosphinate (manufactured by Clariant Japan, EXOLIT (registered trademark) OP 1240)
(D) Nitrogen-Containing Flame Retardant Assistant
D1: Melamine cyanurate (manufactured by BASF Japan, MELAPUR (registered trademark) MC50)
(E) Phosphorous Stabilizer
E1: Sodium dihydrogen phosphate dihydrate (manufactured by YONEYAMA CHEMICAL INDUSTRY CO., LTD, monosodium phosphate)
(F) Filler
F1: Glass fiber (manufactured by Nitto Boseki Co., Ltd., CSF3PE-941, circular cross section)
(G) Other Components
G1: Polytetrafluoroethylene (manufactured by MITSUBISHI RAYON CO., LTD., METABLEN (registered trademark) A-3800)

The respective components shown in Table 1 with the content (based on parts by mass) given in Table 1 were dry-blended together. The blend was then melt-kneaded using a twin screw extruder (TEX-30, manufactured by The Japan Steel Works, Ltd.) at a cylinder temperature of 260° C., an extrusion rate of 15 kg/h, and a screw rotational speed of 150 rpm, to form pellets of the polybutylene terephthalate resin composition. By using the pellets obtained, a test piece was prepared and tensile strength, tensile break deformation, flexural strength, flexural modulus, Charpy impact strength, tracking resistance, and flame retardancy were measured for the polybutylene terephthalate resin composition. Measurement results of the tensile strength, tensile break deformation, flexural strength, flexural modulus, Charpy impact strength, tracking resistance, and flame retardancy of the polybutylene terephthalate resin composition of Examples 1 to 6 and Comparative Examples 1 to 4 are given in Table 1.

In addition, each physical property of the polybutylene terephthalate resin composition was measured according to the method described below.
Tensile Strength and Tensile Break Deformation
Tensile strength and tensile break deformation were measured with reference to ISO 527-1 and 2.
Flexural Strength and Flexural Modulus
Flexural strength and flexural modulus were determined with reference to ISO 178.
Charpy Impact Strength
Charpy impact strength was determined with reference to ISO 179/1eA.
Tracking Resistance Test
The applied voltage (V: voltage) for causing tracking on the test piece was measured by using 0.1% aqueous solution of ammonium chloride and platinum electrode with reference to the third edition of IEC (International Electrotechnical Commission) 112.
Flame Retardancy
A test piece (0.75 mm of thickness) was tested by the vertical position flame test specified by UL-94 Standard of Underwriter's Laboratories Inc.

TABLE 1

| Components for addition | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| (A) | A1 | 65 | 65 | 65 | 65 | 65 | 65 | 65 | 65 | 65 | 65 |
| | A2 | 35 | 35 | 35 | 35 | 35 | 35 | 35 | 35 | 35 | 35 |
| (B) | B1 | 5 | — | — | 10 | — | — | 17 | — | — | — |
| | B2 | — | 5 | — | — | 10 | — | — | 17 | — | — |
| | B3 | — | — | 5 | — | — | 10 | — | — | 17 | — |
| (C) | C1 | 27 | 27 | 27 | 27 | 27 | 27 | 27 | 27 | 27 | 24 |
| (D) | D1 | 13 | 13 | 13 | 13 | 13 | 13 | 14 | 14 | 14 | 12 |
| (E) | E1 | 1 | 1 | 1 | 1 | 1 | 1 | 1 | 1 | 1 | 1 |
| (F) | F1 | 27 | 27 | 27 | 27 | 27 | 27 | 27 | 27 | 27 | 24 |
| (G) | G1 | 0.4 | 0.4 | 0.4 | 0.4 | 0.4 | 0.4 | 0.4 | 0.4 | 0.4 | 0.3 |
| Tensile strength (MPa) | | 80 | 79 | 79 | 79 | 76 | 75 | 79 | 74 | 73 | 82 |
| Tensile break deformation (%) | | 2.4 | 2.4 | 2.2 | 2.2 | 2.4 | 2.0 | 2.0 | 2.3 | 1.9 | 2.3 |
| Flexural strength (MPa) | | 130 | 127 | 126 | 127 | 120 | 119 | 124 | 114 | 113 | 137 |
| Flexural modulus (MPa) | | 6555 | 6538 | 6573 | 6620 | 6235 | 6378 | 6790 | 5915 | 6252 | 6689 |
| Charpy impact strength (kJ/m$^2$) | | 5.3 | 5.5 | 5.3 | 5.2 | 5.6 | 4.9 | 4.7 | 5.6 | 4.6 | 5.2 |
| Tracking resistance (V) | | 600 or more | 600 or more | 600 or more | 600 or more | 600 or more | 600 or more | 600 or more | 600 or more | 600 or more | 550 |
| Flame retardancy (UL-94) | | V-0 | V-0 | V-0 | V-0 | V-0 | V-0 | V-0 | V-0 | V-0 | V-0 |

From Table 1, it was found that the tracking resistance is improved by addition of a polyamide resin when Examples 1 to 6 and Comparative Examples 1 to 3 are compared with Comparative Example 4. Further, by adding an organic phosphorous flame retardant and a nitrogen-containing flame retardant assistant, all Examples and Comparative Examples were evaluated to have flame retardancy V-0, indicating good flame retardancy.

Meanwhile, the polybutylene terephthalate resin composition of Examples 1 to 6 has no decrease in mechanical properties such as tensile strength, tensile break deformation, flexural strength, and flexural modulus compared to the polyterephthalate resin composition of Comparative Example 4 in which no polyamide resin is contained. However, the polyterephthalate resin composition of Comparative Examples 1 to 3 in which a great amount of polyamide resin is contained, i.e., 17 parts by mass to 100 parts by mass of the poly terephthalate resin, showed significantly impaired mechanical properties.

Examples 7, 8, 9 and 10

As Example 7 and Example 8, a water absorption test was performed at 23° C. with relative humidity of 50%. Further, as Example 9 and Example 10, a water absorption test was performed at 23° C. with relative humidity of 100%. As a test piece for water absorption test, the polybutylene terephthalate resin composition obtained from Example 1 was used for Example 7 and Example 9, while the polybutylene terephthalate resin composition obtained from Example 4 was used for Example 8 and Example 10 to prepare, by extrusion molding, a plate-like molded article having a size of 65 mm×55 mm×2 mm. The obtained test piece was vacuum dried for 100 hours at 120° C., and the weight of the test piece at that time was taken as a weight of the test piece at the beginning of the test. After measuring the weight of the test piece at the beginning of the test, the test piece was placed in a thermo-hygrostat which had been set under pre-determined conditions. The water absorption test was started accordingly. Twenty-four, forty-eight, seventy-two, or one hundred forty-four hours after starting the water absorption test, the weight of the test piece was measured to obtain water absorption ratio. The water absorption ratio is calculated based on the following equation in which the weight of the test piece at the beginning of the test is $W_0$ and the weight of the test piece after the test is $W_1$. Results of the water absorption test are described in Table 2.

Equation for calculating water absorption ratio $$\text{Water absorption ratio} = (W_1 - W_0)/W_0 \times 100$$

Comparative Examples 5 and 6

As Comparative Example 5, a water absorption test was performed at 23° C. with relative humidity of 50%. Further, as Comparative Example 6, a water absorption test was performed at 23° C. with relative humidity of 100%. The water absorption test of Comparative Examples 5 and 6 was carried out in the same manner as in Examples 7 and 8 except that the test piece was prepared by using the polybutylene terephthalate resin composition which had been obtained in the Comparative Example 1. Results of the water absorption test are described in Table 2.

Reference Examples 1 and 2

As Reference Example 1, a water absorption test was performed at 23° C. with relative humidity of 50%. Further, as Reference Example 2, a water absorption test was performed at 23° C. with relative humidity of 100%. The water absorption test of Reference Examples 1 and 2 was carried out in the same manner as in Examples 7 and 8 except that the test piece was prepared by using the polybutylene terephthalate resin composition which had been obtained in the Comparative Example 4. Results of the water absorption test are described in Table 2.

TABLE 2

|  | Example 7 | Example 8 | Comparative Example 5 | Reference Example 1 | Example 9 | Example 10 | Comparative Example 6 | Reference Example 2 |
|---|---|---|---|---|---|---|---|---|
| Condition for test | 23° C., Relative humidity 50% | | | | 23° C., Relative humidity 100% | | | |
| Use ratio of polyamide resin * | 5 | 10 | 17 | 0 | 5 | 10 | 17 | 0 |
| Water absorption ratio | | | | | | | | |
| 0 hr | 0 | 0 | 0 | 0 | 0 | 0 | 0 | 0 |
| 24 hr | 0.040 | 0.047 | 0.052 | 0.033 | 0.086 | 0.103 | 0.122 | 0.066 |
| 48 hr | 0.055 | 0.066 | 0.076 | 0.043 | 0.126 | 0.152 | 0.179 | 0.094 |
| 72 hr | 0.069 | 0.080 | 0.092 | 0.053 | 0.151 | 0.184 | 0.215 | 0.112 |
| 144 hr | 0.095 | 0.112 | 0.130 | 0.075 | 0.222 | 0.273 | 0.322 | 0.162 |

* Content, in the composition, of polyamide resin to 100 parts by mass of polybutylene terephthalate resin.

From Table 2, it is found that Comparative Examples 5 and 6 in which a polybutylene terephthalate resin composition containing a great amount of a polyamide resin, i.e., 17 parts by mass of the polylamide resin to 100 parts by mass of the polybutylene terephthalate resin, was used showed significantly increased water absorption amount compared to Reference Examples 1 and 2 in which the polybutylene terephthalate resin composition not containing a polyamide resin was used. Meanwhile, it is also found that, with the amount of the polyamide of Examples 7 to 10, only a small increase in water absorption amount was obtained.

The invention claimed is:

1. A polybutylene terephthalate resin composition comprising (A) polybutylene terephthalate resin, (B) polyamide resin, (C) an organic phosphorous flame retardant, and (D) a nitrogen-containing flame retardant assistant, wherein the content of said (B) polyamide resin is not less than 1 part by mass and not more than 5 parts by mass to 100 parts by mass of said (A) polybutylene terephthalate resin, wherein said (C) organic phosphorous flame retardant is phosphinic acid salt and/or diphosphinic acid salt.

2. The polybutylene terephthalate resin composition according to claim 1, wherein said (B) polyamide resin is one or more selected from the group consisting of Nylon 6, Nylon 11, and Nylon 12.

3. The polybutylene terephthalate resin composition according to claim 1, wherein said (D) nitrogen-containing flame retardant assistant is a salt of a triazine compound and cyanuric acid or isocyanuric acid, and/or a complex salt of an amino group-containing nitrogen compound and polyphosphoric acid.

4. The polybutylene terephthalate resin composition according to claim 1, further comprising (E) a phosphorous stabilizer.

5. The polybutylene terephthalate resin composition according to claim 4, wherein said (E) phosphorous stabilizer is one or more selected from the group consisting of a phosphoric acid ester compound, a phosphorous acid ester compound, a phosphonic acid ester compound, and a metallic phosphate compound.

6. The polybutylene terephthalate resin composition according to claim 1, further comprising (F) a filler.

7. The polybutylene terephthalate resin composition according to claim 1, wherein, in accordance with the third edition of IEC112, the comparative tracking index (CTI) measured by using 0.1% aqueous ammonium chloride solution and a platinum electrode is 600 V or more.

8. A molded article for a component of an electric vehicle, molded from the polybutylene terephthalate resin composition according to claim 1.

9. A case for housing a component of an electric vehicle, molded from the polybutylene terephthalate resin composition according to claim 1.

10. The polybutylene terephthalate resin composition according to claim 1, wherein the content of said (C) organic phosphorous flame retardant is not less than 15 parts by mass and not more than 60 parts by mass to 100 parts by mass of said (A) polybutylene terephthalate resin.

* * * * *